US005933680A

United States Patent [19]
Nishimura

[11] Patent Number: 5,933,680
[45] Date of Patent: Aug. 3, 1999

[54] IMAGE PROCESSING APPARATUS AND METHOD FOR OPTIMIZING AN IMAGE FORMATION CONDITION

[75] Inventor: Ken Nishimura, Susono, Japan

[73] Assignee: Canon Kabushiki Kaisha, Tokyo, Japan

[21] Appl. No.: 08/806,050

[22] Filed: Feb. 25, 1997

[30] Foreign Application Priority Data

Feb. 29, 1996 [JP] Japan .................................... 8-042856

[51] Int. Cl.$^{6}$ ............................. G03G 15/01; H04N 1/40

[52] U.S. Cl. ............................ 399/49; 358/406; 358/518; 399/72

[58] Field of Search ............................. 399/49, 223, 302, 399/72; 358/518, 521, 406, 448

[56] References Cited

U.S. PATENT DOCUMENTS

| | | | |
|---|---|---|---|
| 4,801,980 | 1/1989 | Arai et al. | 399/29 |
| 4,888,636 | 12/1989 | Abe | 358/519 |
| 5,016,050 | 5/1991 | Roehrs et al. | 399/49 X |
| 5,019,859 | 5/1991 | Nash | 355/77 |
| 5,122,835 | 6/1992 | Rushing et al. | 399/49 |
| 5,483,328 | 1/1996 | Kawasaki et al. | 399/49 |
| 5,499,092 | 3/1996 | Sasaki | 399/302 |
| 5,579,090 | 11/1996 | Sasanuma et al. | 399/49 |
| 5,682,573 | 10/1997 | Ishikawa et al. | 399/49 X |
| 5,722,007 | 2/1998 | Ogata et al. | 399/49 |

FOREIGN PATENT DOCUMENTS

| | | |
|---|---|---|
| 004572 | 3/1979 | European Pat. Off. . |
| 149850 | 12/1984 | European Pat. Off. . |
| 411865 | 7/1990 | European Pat. Off. . |
| 454479 | 4/1991 | European Pat. Off. . |
| 520144 | 3/1992 | European Pat. Off. . |
| 7-256987 | 10/1995 | Japan . |

*Primary Examiner*—Arthur T. Grimley
*Assistant Examiner*—Sophia S. Chen
*Attorney, Agent, or Firm*—Fitzpatrick, Cella, Harper & Scinto

[57] ABSTRACT

An object of the present invention is to prevent deterioration of measurement accuracy due to a substrate density change, by forming a density measurement image used for density measurement in a non-printing region of which substrate density change is smaller than that of a printing region. In order to achieve this object, there is provided, in an image formation apparatus for forming an image on an image support body in an electrophotographic system, an image processing apparatus. The apparatus forms the density measurement image in the non-printing region on the image support body, measures the density measurement image and controls an image formation condition of the image formation apparatus on the basis of a measurement of the density measurement image.

20 Claims, 9 Drawing Sheets

IMAGE PROCESSING APPARATUS AND METHOD FOR OPTIMIZING AN IMAGE FORMATION CONDITION

BACKGROUND OF THE INVENTION

1. Field of the Invention

The present invention relates to image processing apparatus and method for optimizing an image formation condition in accordance with states of an image formation apparatus.

2. Related Background Art

Hereinafter, conventional art will be explained with reference to accompanying drawings.

FIG. 7 is a sectional view showing a multi-color image formation apparatus. As shown in FIG. 7, in the multi-color image formation apparatus, a photosensitive drum 1 and a charge unit 3 are provided. Further, on a left side of the drum 1, a plurality of development units 4*a*, 4*b*, 4*c* and 4*d* are supported by a rotatable support unit 4. Furthermore, on a right side of the drum 1, there is provided an intermediate transfer body 5 which supports a plurality colors of toner images simultaneously. In such structure, the photosensitive drum 1 is rotatively driven in a direction indicated by an arrow, by a not-shown drive means.

On an upper side in the multi-color image formation apparatus, there are provided a laser diode 12 which constructs an exposure unit, a polygon mirror 14 which is rotatively driven by a high-speed motor 13, a lens 15, and a reflection mirror 16.

In a case where a signal representing an yellow (to be referred as "Y" hereinafter) image is input into the laser diode 12, light information corresponding to the Y image is irradiated onto the photosensitive drum 1 via an optical path 17, and thus a latent image is formed. Further, if the photosensitive drum 1 rotates in the direction indicated by the arrow, the formed latent image is visualized by the development unit 4*a* using a Y toner. The toner image on the drum 1 is then transferred onto the intermediate transfer body 5.

By performing such a process also for magenta (to be referred as "M" hereinafter), cyan (to be referred as "C" hereinafter) and black (to be referred as "Bk" hereinafter) respectively, a full-color image using a plurality colors of toners is formed on the intermediate transfer body 5. Subsequently, when the toner image including a plurality of colors on the intermediate transfer body 5 reaches a transfer portion at which a transfer charge unit 6 is arranged, the toner image on the intermediate transfer body 5 is transferred onto a transfer member. In this case, the transfer member has been supplied to the transfer portion before the toner image reaches. Further, the toner image on the transfer member is melted to be fixed to the member by a fixing unit 9, thereby obtaining the color image.

On the other hand, the residual toner on the photosensitive drum 1 is cleaned away by a cleaning unit 11 such as a fur brush, a blade or the like. Also, the toner on the intermediate transfer body 5 is cleaned away by a cleaning unit 10 such as a fur brush, a web or the like. In this case, the cleaning unit 10 eliminates the toner by rubbing a surface of the intermediate transfer body 5.

In the above-described multi-color image formation apparatus, if an image density varies according to various conditions such as use circumstances, the number of prints and the like, an inherent and correct tone (i.e., color tone) can not be obtained. Therefore, conventionally, in order to judge a state of the image in case of the image formation, a toner image (to be referred as "patch" hereinafter) to be used for detecting each color density is experimentally formed on an image support body to automatically detect such the density. Subsequently, a detected result is fed back to a process condition, e.g., light exposure quantity, development bias and the like, and to an image formation condition which is controlled by a color process, e.g., gamma correction or the like. Thus, density control is performed to form the inherent color image, and to obtain the stable image.

In this case, as shown in FIG. 9, there has been popularly known as a patch formation method a method in which the patches of the respective colors are sequentially formed from an image formation start position and all the formed patches are held within a printing region.

Conventionally, as a density sensor 2 for detecting a density of the patch, there has been frequently used a type having structure shown in FIG. 8. That is, a light emission element 102 irradiates an infrared light onto the Y, M, C and Bk toners (or toner patches) on the intermediate transfer body 5, by using an infrared LED. Then, a reflected light from the intermediate transfer body 5 is detected by a light reception element 101 to be converted into an electrical signal. In the density sensor 2, the light emission element 102 is arranged at an angle different from that of the light reception element 101, such that the light reception element 101 measures an irregular reflection light from patches 105A and 105B. Such the structure has an advantage that a pair of the light emission element 102 and the light reception element 101 can detect all the Y, M, C and Bk toners, but has a disadvantage that an output characteristic of the density sensor 2 for the Y, M and C toner patches is different from that for the Bk toner patch. For this reason, in case of converting sensor outputs into densities, sequence in a process for the Bk toner must be made different from sequence in processes for the Y, M and C toners.

As structure of an another density sensor, there is supposed the structure in which the three colors of light emission elements corresponding to respective spectra of the Y, M and C toners and the corresponding three colors of light reception elements are provided to detect the densities of the patches respectively corresponding to the Y, M and C toners. Such the structure has an advantage that all of the four kinds of toners have the same output characteristic of the density sensor. For this reason, there is only one sequence in the process for converting the sensor output into the density. On the other hand, such the structure has a disadvantage that three pairs of the light emission and reception elements are necessary, whereby a manufacturing cost is significantly increased and also a size of the entire apparatus becomes large. For this reason, such the structure is hardly used in the density sensor which is arranged in the multi-color image formation apparatus.

In any case, when the residual toner on the intermediate transfer body 5 is cleaned away, such the residual toner can not be completely eliminated. Therefore, there has been confirmed by the inventors of the present invention that the residual toners are gradually accumulated and thus causes a change in a surface color of the intermediate transfer body 5, thereby degrading a reflectance. Further, there has been confirmed that, since a result of the density detection is remarkably influenced by the reflectance (i.e., reflectance for a light used for detecting the density) of a substrate (or background) on which the toner is attached, there has been occurred a problem that a density measurement value varies as time elapses.

FIG. 6 shows a relation between the toner density and the density sensor output in a case where the patch is measured at each of positions A, B and C on the intermediate transfer body. In this case, the reflectances of the positions A, B and C are different from others, and become lower in order of the positions A, B and C. Further, the same measurement result can be obtained respectively for the Y, M and C toners, whereby FIG. 6 shows the measurement result of the M toner as a representative example.

There can be understood from FIG. 6 that, as the reflectance of the intermediate transfer body becomes lower, a dynamic range of the density sensor output for the Bk toner becomes narrower. This means that density detection accuracy for the Bk toner is degraded.

That is, as the substrate density becomes higher since the residual toners not eliminated even by the cleaning are accumulated, the reflectance of the intermediate transfer body is degraded. Therefore, highly-accurate detection of a contrast of the Bk toner becomes impossible.

The same problem will occur not only for a printer of a type (i.e., batch transfer type) having such the intermediate transfer body as described above, but also for a printer of a type (i.e., multiple transfer type) in which the toner image on the photosensitive drum is overlapped each other on a recording sheet or paper sequentially for each color.

On the other hand, as to the patch formation onto the intermediate transfer body and the sequence in the patch density measurement, there has been desired an effective method which is inherent in the printer of the type using the intermediate transfer body.

SUMMARY OF THE INVENTION

The present invention has been made in consideration of the above-described problems, and thus an object of the present invention is to prevent deterioration in measurement accuracy due to a change in substrate density, by forming a density measurement image used for density measurement in a non-printing region in which the change in substrate density is smaller than that in a printing region.

In order to achieve the above object, according to the present invention, there is provided an image processing apparatus in an image formation apparatus for forming an image on an image support body in an electrophotographic system, the image processing apparatus comprising:

- a density measurement image formation means for forming the density measurement image in the non-printing region on the image support body;
- a measurement means for measuring the density measurement image; and
- a control means for controlling an image formation condition of the image formation apparatus, on the basis of a measurement result by the measurement means.

An another object of the present invention is to be able to perform highly-accurate measurement in correspondence with a characteristic of a recording agent.

In order to achieve the above object, according to the present invention, there is provided an image processing apparatus in an image formation apparatus for forming an image on an image support body in an electrophotographic system, the image processing apparatus comprising:

- a density measurement image formation means for forming a first density measurement image used for density measurement, in a non-printing region on the image support body by using a first recording agent, and for forming a second density measurement image used for density measurement, in a printing region on the image support body by using a second recording agent different from the first recording agent;
- a measurement means for measuring the first density measurement image and the second density measurement image; and
- a control means for controlling image formation conditions of the image formation apparatus on the basis of a measurement result by the measurement means, the image formation conditions respectively corresponding to the first recording agent and the second recording agent.

Still another object of the present invention is to perform a highly-accurate optimization process by averaging substrate densities.

In order to achieve the above object, according to the present invention, there is provided an image processing apparatus for optimizing an image formation condition in accordance with an output characteristic of an image formation means, comprising:

- a density measurement image formation means for forming a plurality of density measurement images used for density measurement, the images respectively having different gradations;
- a measurement means for measuring the density measurement image; and
- an image formation condition optimization means for optimizing the image formation condition on the basis of a measurement result by the measurement means,
- wherein the density measurement image formation means arbitrarily sets formation order of the plurality of density measurement images respectively having the different gradations, for each optimization process.

Still another object of the present invention is to improve a method of measuring a density measurement image used for density measurement, in an image formation apparatus of a type having an intermediate transfer body.

In order to achieve the above object, according to the present invention, there is provided an image processing apparatus in the image formation apparatus which has the intermediate transfer body for simultaneously supporting images formed by a plurality colors of recording agents, and a transfer body for transferring the images supported by the intermediate transfer body to a recording medium, the image processing apparatus comprising:

- a density measurement image formation means for forming the density measurement image on the intermediate transfer body; and
- a measurement means for measuring the density measurement image,
- wherein the measurement means performs the measurement in a state that the plurality colors of density measurement images have been formed on the intermediate transfer body.

The above and other objects of the present invention will become apparent from the following detailed description when read in conjunction with the accompanying drawings.

DETAILED DESCRIPTION OF THE PREFERRED EMBODIMENTS

Figure 7:
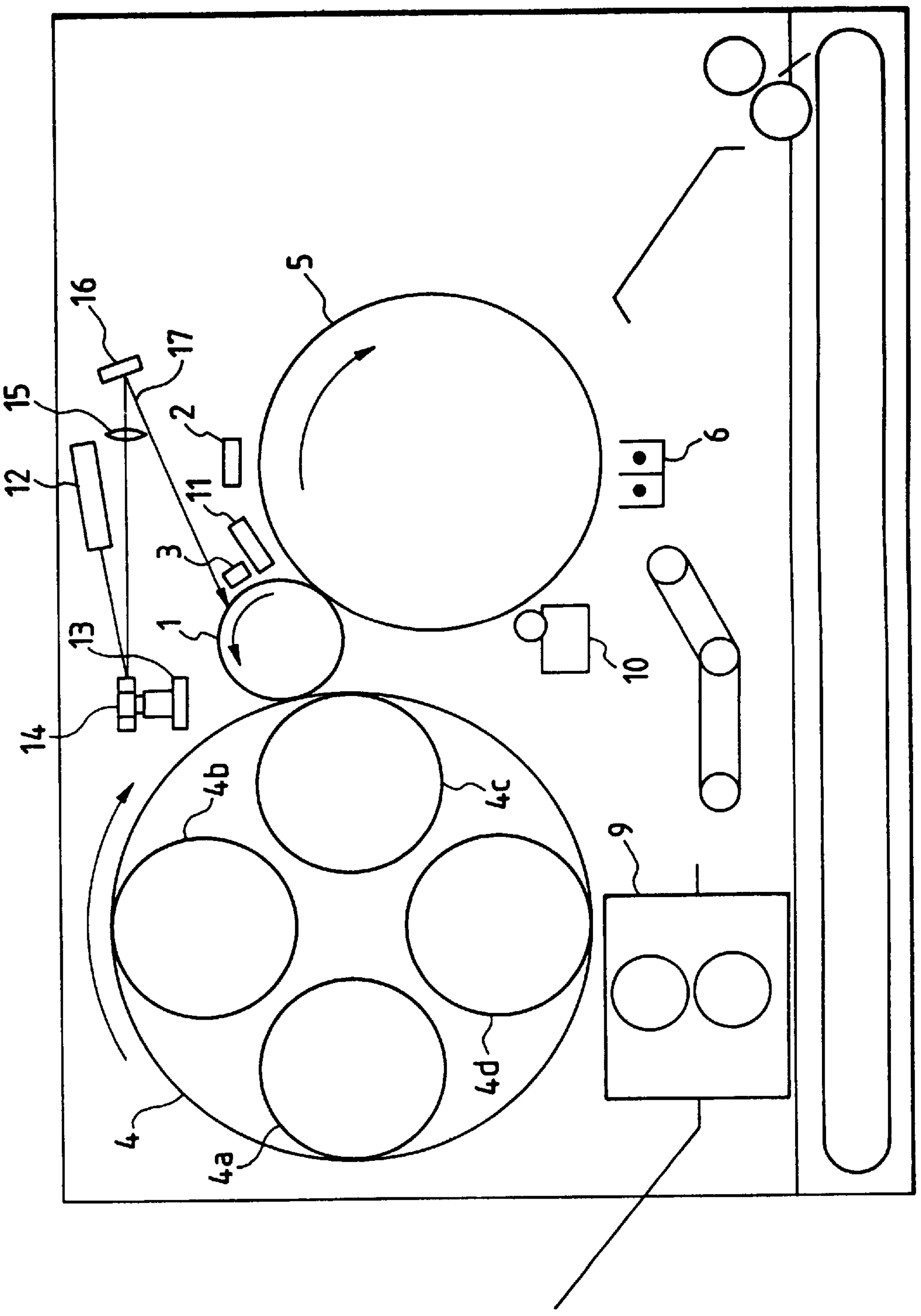
FIG. 7 is a block diagram showing an example of the entire structure of the multi-color image formation apparatus.
Figure 8:
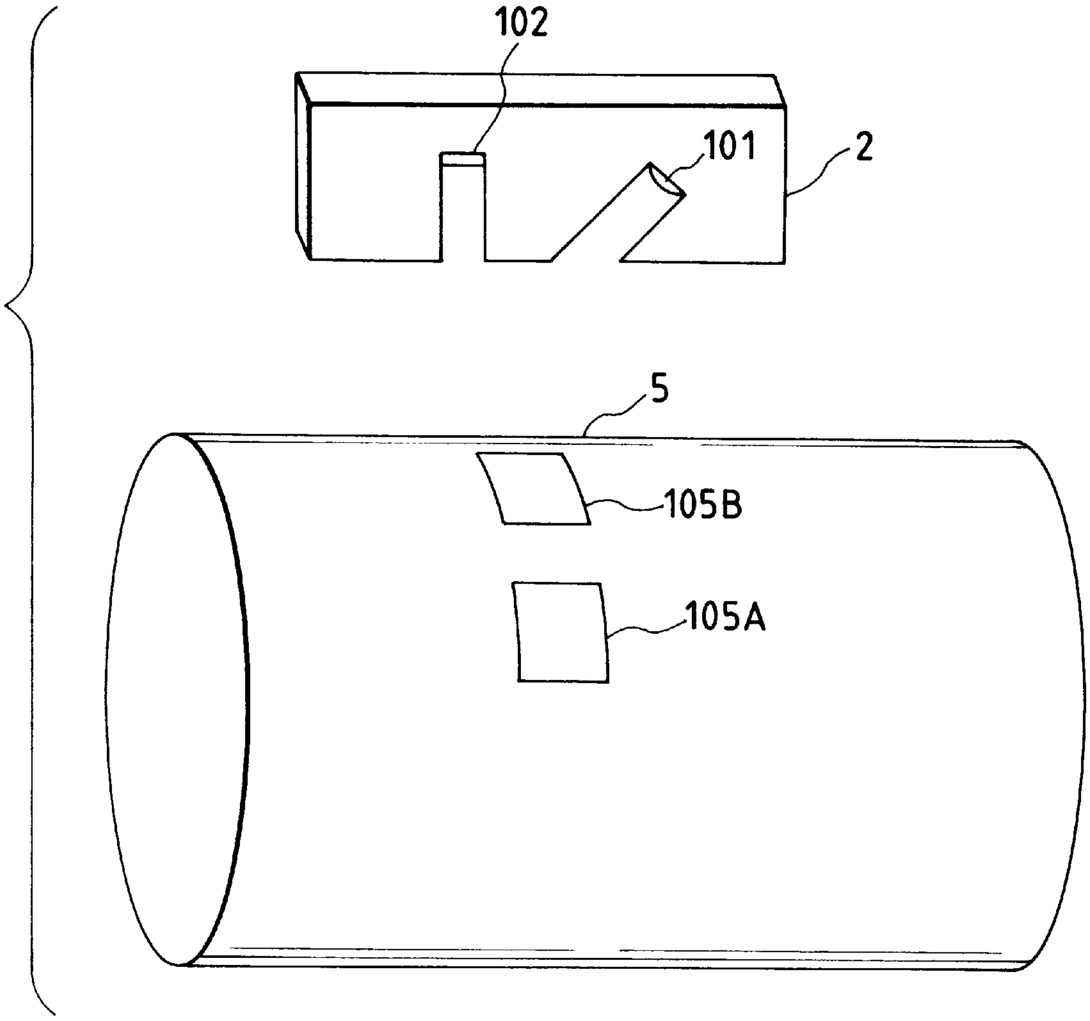
FIG. 8 is a block diagram showing principle structure of a density detection process.
Figure 9:
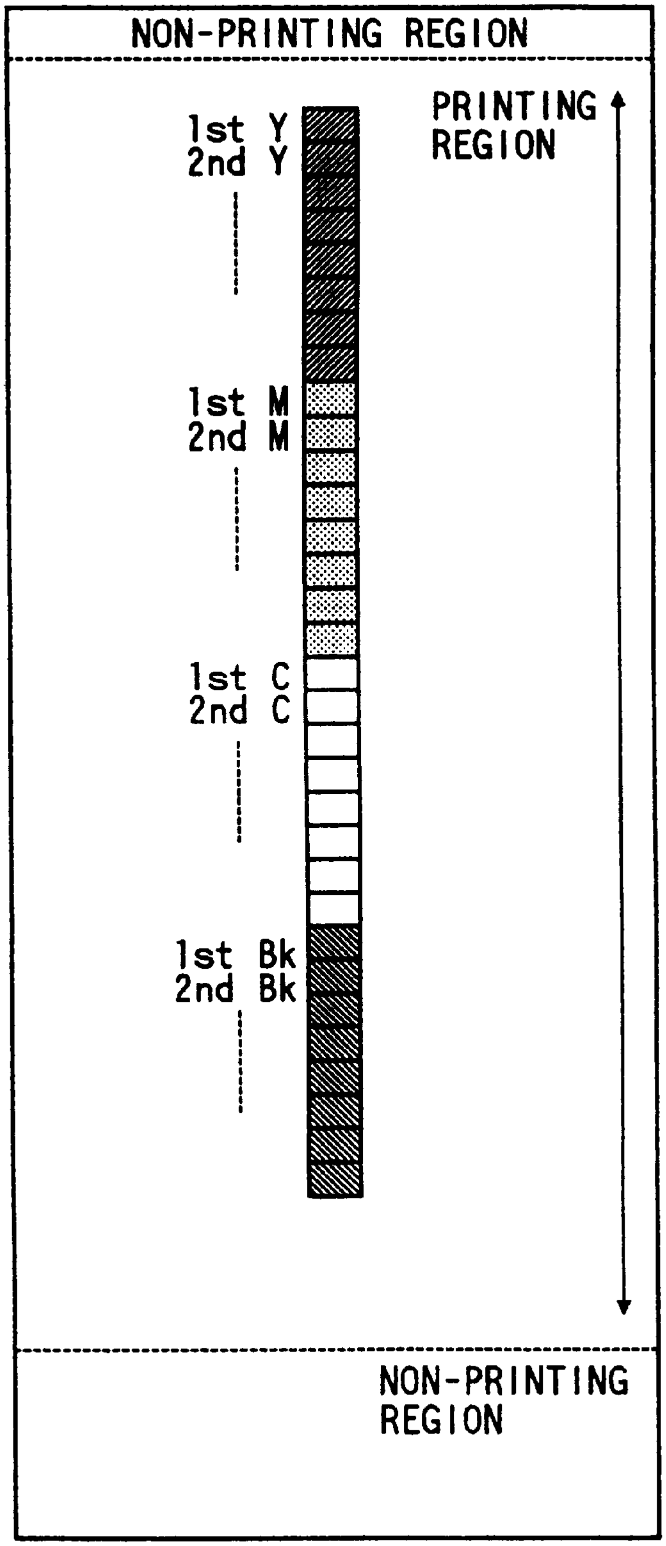
FIG. 9 PRIOR ART
FIG. 9 is a view showing a conventional patch pattern.

Hereinafter, a multi-color image formation apparatus according to the present invention will be explained in detail with reference to accompanying drawings. In the embodiments explained below, it is assumed that the present invention is concretely realized in the multi-color image formation apparatus shown in FIG. 7. Therefore, detailed explanation of the entire structure and functions of the multi-color image formation apparatus will be omitted.

First Embodiment

Figure 1:
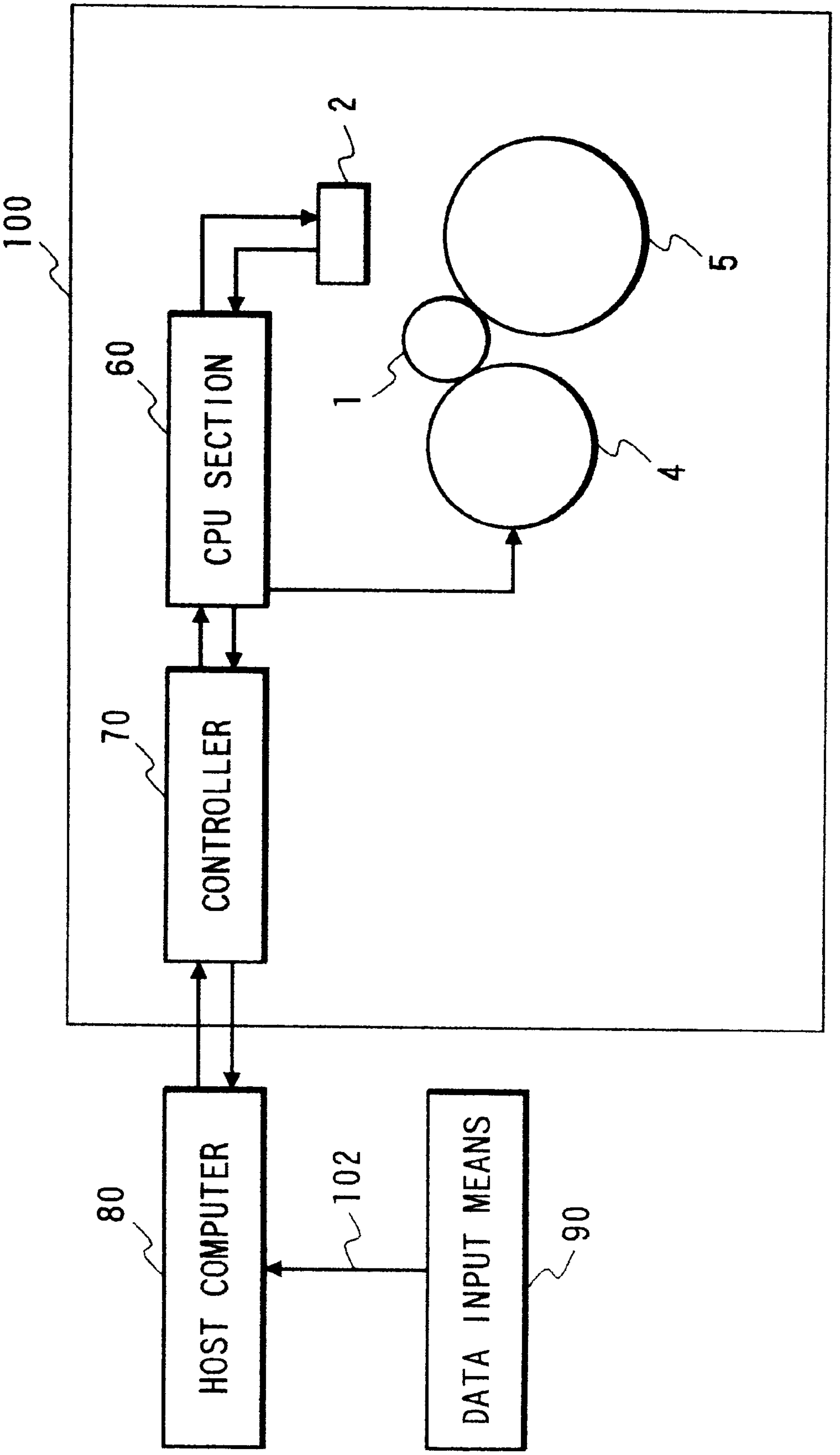
FIG. 1 is a block diagram showing an example of structure of a multi-color image formation apparatus according to a first embodiment of the present invention.

FIG. 1 is a block diagram showing the structure of the multi-color image formation apparatus according to one embodiment of the present invention. In FIG. 1, a multi-color image formation apparatus 100 has a photosensitive drum 1 which acts as a photosensitive medium, a development unit 4, an intermediate transfer body 5, a density detection sensor 2 which acts as a density measurement means, a CPU section 60 which controls the above-described units, and a controller 70. The controller 70 performs communication with a host computer 80 (i.e., external unit) to receive input data (to be referred as video data hereinafter) representing eight-bit density information respectively for M, C, Y and Bk colors, and to perform an image process on the basis of the input data. Also, by receiving a signal from the CPU section 60, the controller 70 performs communication control in which, e.g., information as to a printer situation is transferred to the host computer 80. In this case, an operator inputs such the information into the host computer 80 by using an input means 90 such as a keyboard, a mouse or the like, via a signal line 102.

Figure 2:
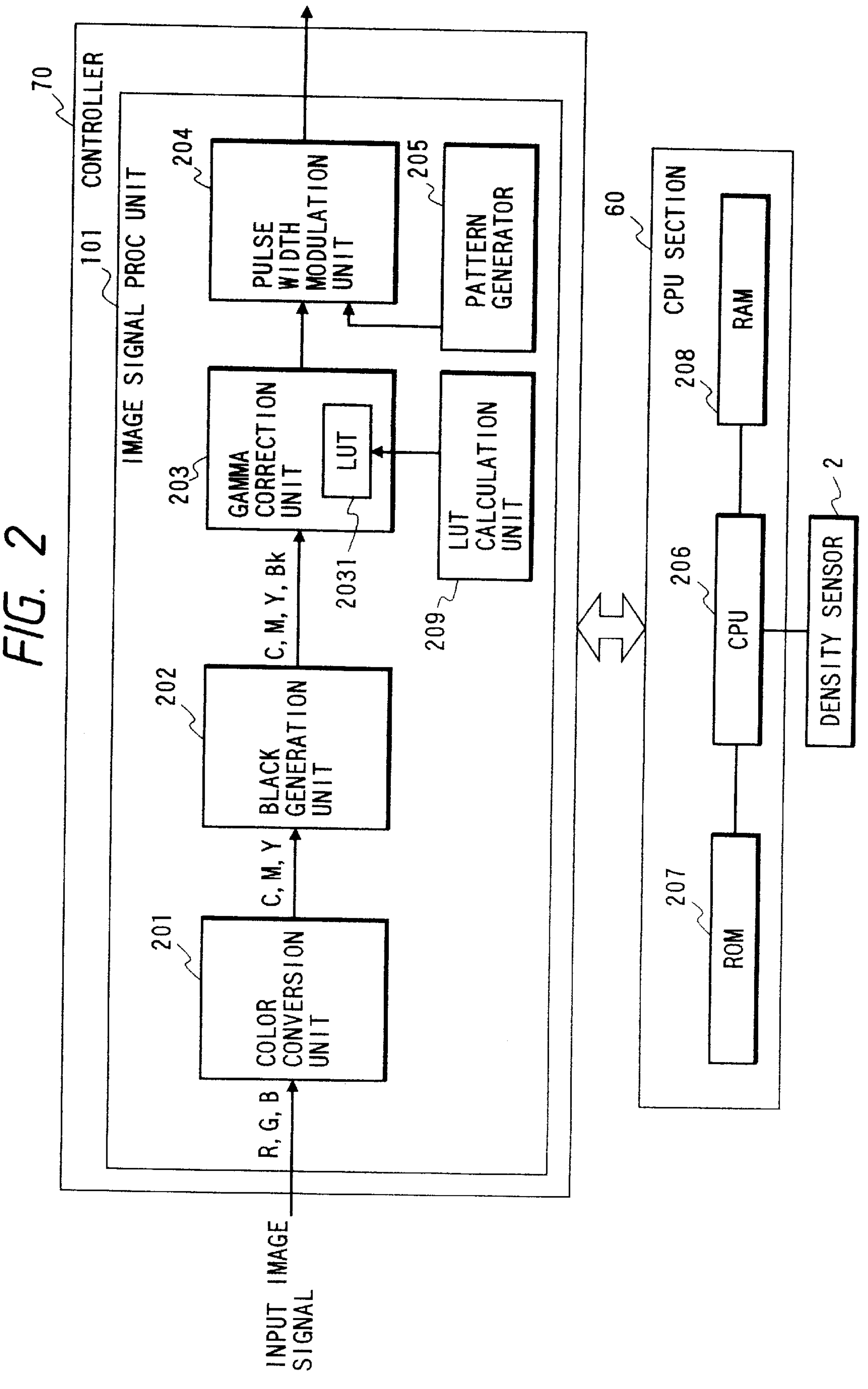
FIG. 2 is a block diagram showing an example of structure of an image process unit.

FIG. 2 shows structure of an image process unit which performs an image signal process including density control performed by the controller 70.

Red (R), green (G) and blue (B) image signals which have been input from the host computer 80 are converted into C, M and Y signals by a color conversion unit 201. Subsequently, a Bk signal is generated from the C, M and Y signals by a black generation unit 202. The obtained C, M, Y and Bk signals are subjected to density gradation correction using a look-up table (LUT) 2031, by a gamma correction unit 203. Then, the converted signals are subjected to pulse width modulation by a pulse width modulation unit 204, to generate a drive signal for a laser diode 12.

Reference numeral 205 denotes a pattern generator which generates gradation patch data of each color for image formation condition control in the present embodiment. Reference numeral 209 denotes an LUT calculation unit which appropriately calculates and updates the LUT 2031 in the gamma correction unit 203, on the basis of measured density values of a substrate (or background) and a patch by the density sensor 2. The CPU 206 which generally and comprehensively controls the structure of an image signal process unit 101 operates in accordance with a control program stored in a ROM 207. Reference numeral 208 denotes a RAM which is used as a working space of the CPU 206. In this case, e.g., the data setting in the LUT 2031 may have been previously stored in the RAM 208.

Figure 4:
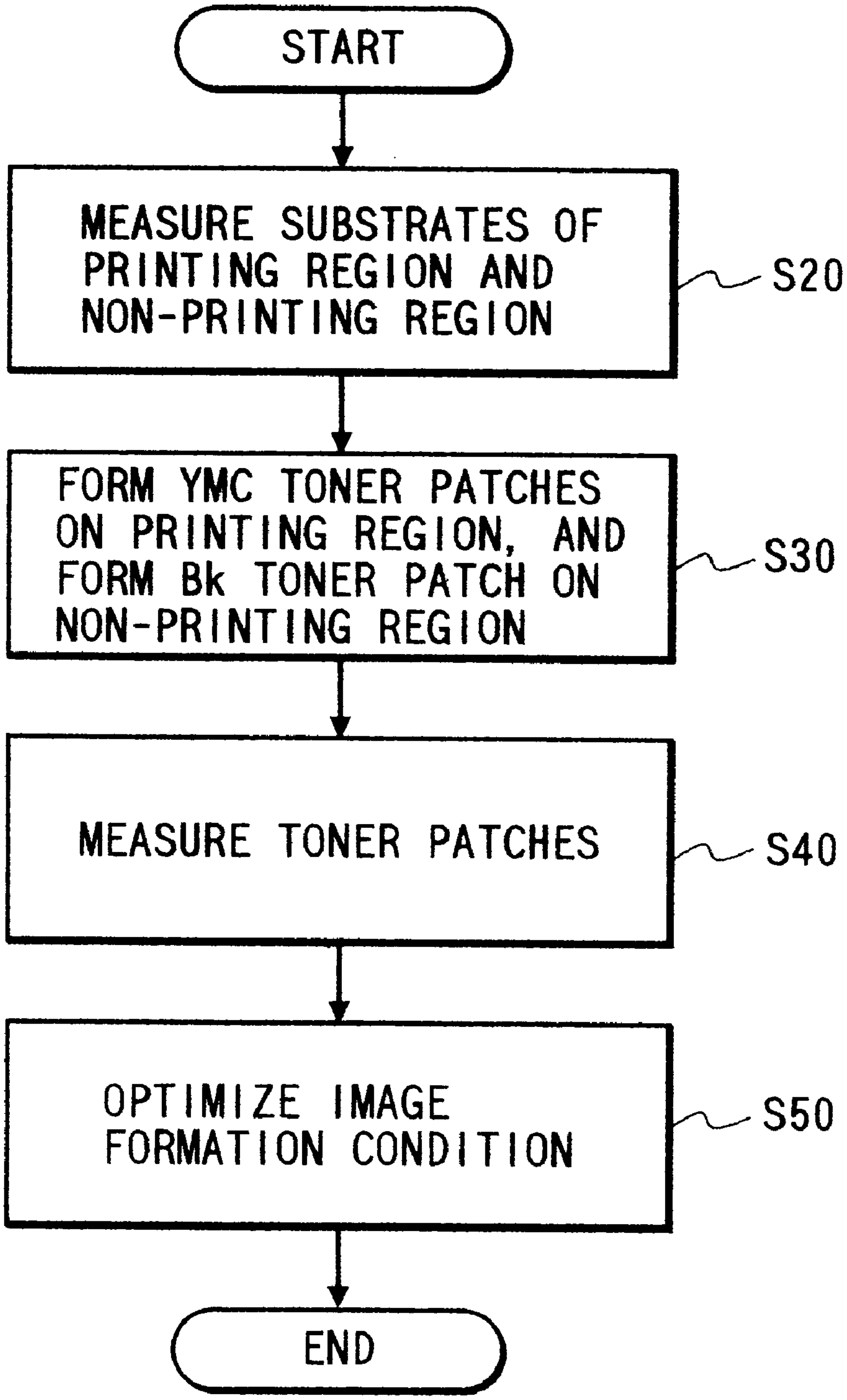
FIG. 4 is a flow chart showing an example of flow of an optimization process.

Hereinafter, a process for optimizing an image formation condition in the present embodiment will be explained. FIG. 4 is a flow chart showing such the process.

Initially, densities at positions (i.e., in a printing region and a non-printing region) which become the substrate or the background of the patch are measured and detected on a surface of the intermediate transfer body 5, by the density sensor 2. Then, obtained information is stored in the RAM 208 of the CPU section 60 (step S20). Subsequently, by using an Y (yellow) patch, a gradation patch (i.e., Y patch) is formed on the photosensitive drum 1. Then, the formed Y patch is transferred from the photosensitive drum 1 to the intermediate transfer body 5. In the same manner, gradation patches for M (magenta) and C (cyan) toners (i.e., M patch and C patch) are formed on the photosensitive drum 1 and transferred to the intermediate body 5 subsequently to the former-transferred Y patch.

Figure 3:
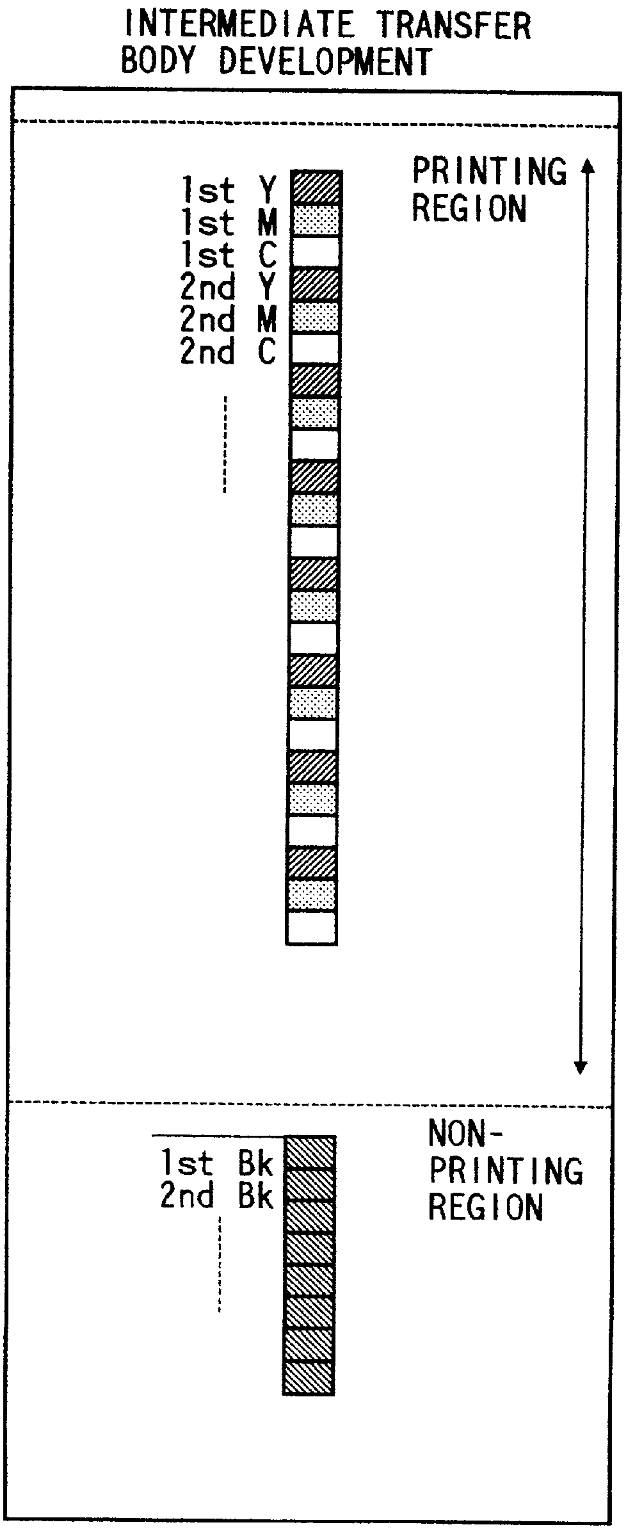
FIG. 3 is a view showing an example of a patch pattern formed on an intermediate transfer body.

Finally, by using a Bk (black) toner, a patch (Bk patch) is formed (step S30). FIG. 3 shows positions on the intermediate transfer body 5 to which the Bk patch is formed. In FIG. 3, the Bk toner patch is not formed directly at the back of the C patch which has been formed immediately before the Bk toner patch is formed, but is ordinarily formed in the non-printing region in which a toner image is not formed for the printing. In the present embodiment, the non-printing region represents an outside region of a printing range corresponding to a printable maximum paper (or sheet) size on the intermediate transfer body. After then, the Bk patch is transferred from the photosensitive drum 1 to the intermediate transfer body 5 (step S30).

Then, the densities of the chromatic color (Y, M and C) patches and the Bk patch which have been formed as latent images on the intermediate transfer body 5 are measured by the density detection sensor 2 and stored in the RAM (step S40).

On the basis of the substrate densities of the printing region and the non-printing region measured in the step S20 and the densities of the chromatic color patches and the Bk patch measured in the step S40, the image formation condition is optimized (step S50).

That is, on the basis of the substrate density of the printing region and the density of the patch having the plurality of different gradations for each of the Y, M and C, the LUT 2031 for each color which LUT is used by the gamma correction unit 203 is optimized.

Further, on the basis of the substrate density of the non-printing region and the density of the patch having the plurality of different gradations for the Bk, the LUT for the Bk which LUT is used by the gamma correction unit 203 is optimized.

Figure 5:
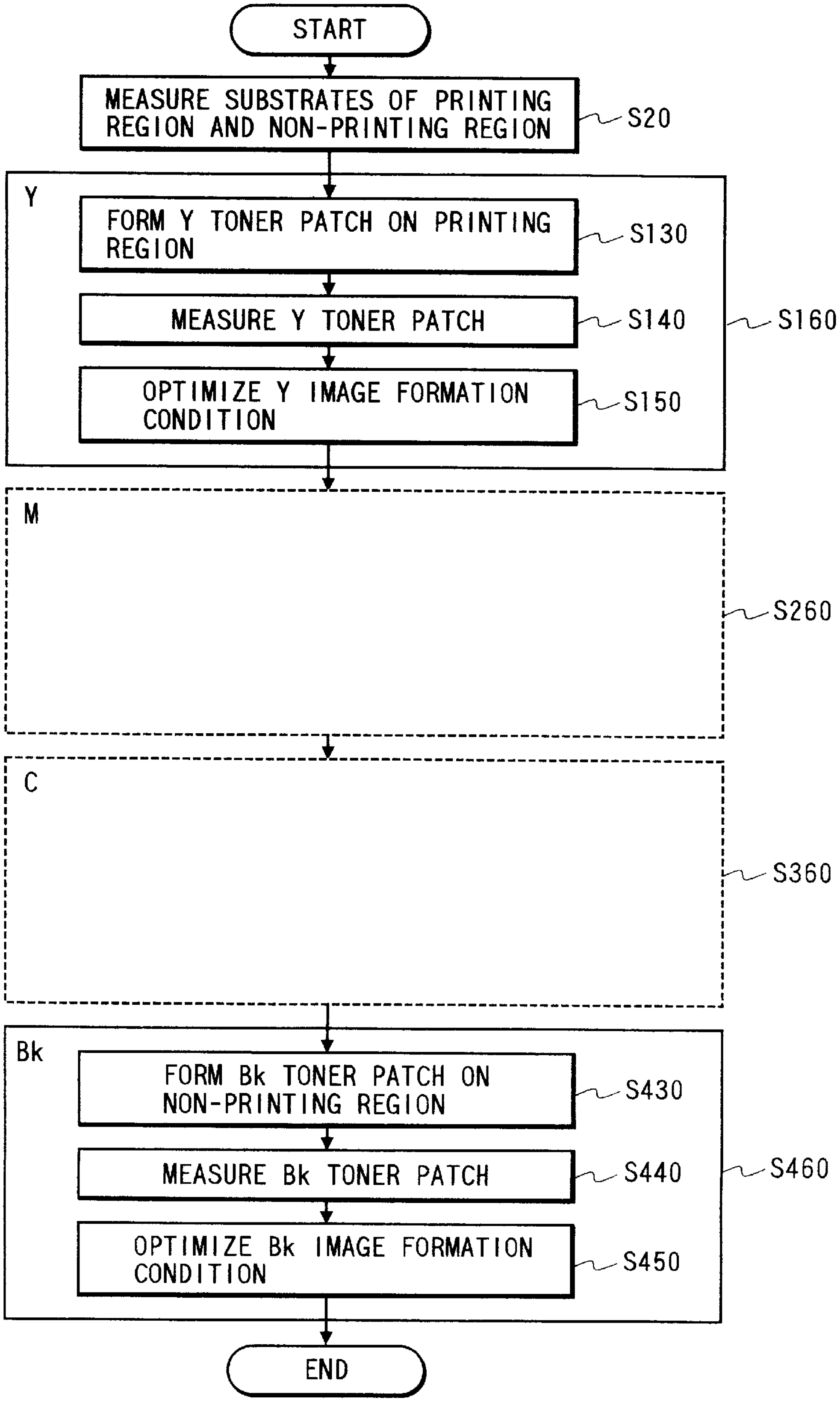
FIG. 5 is a flow chart showing another example of flow of the optimization process.
Figure 6:
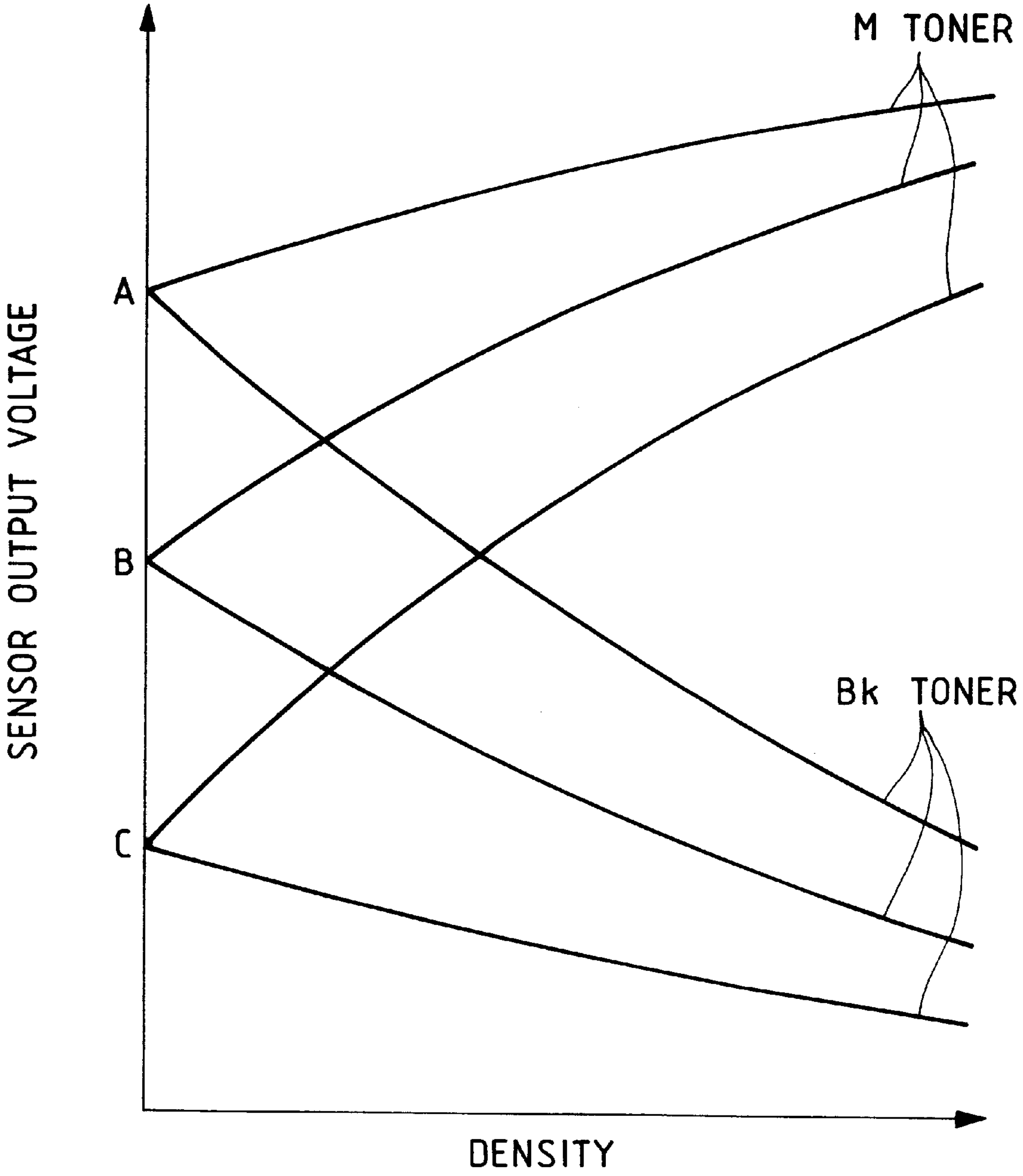
FIG. 6 is a graph showing an example of a relation between a sensor output and a toner density.

In the non-printing region on the intermediate transfer body 5 shown in FIG. 5, in ordinary printing sequence, the change in the reflectance of the surface due to the residual toner does not occur (or little even if it occurs) even if the intermediate transfer body 5 is repeatedly used. For this reason, the accuracy in the Bk patch measurement is not deteriorated and thus the stable density measurement can be performed.

Further, as described above, by measuring the patches after the Y, M, C and Bk patches are sequentially formed on the intermediate transfer body, even if the former-formed color patch is changed due to influence of the later-formed color patch, the patch measurement can be performed in consideration of such the change. This allows the accurate patch measurement especially in the image formation apparatus of the type using the intermediate transfer body.

Furthermore, by forming the patches corresponding to the plurality of gradations concerning the same color in the same region (printing region or non-printing region), it can be prevented that the patches concerning the same color are formed in different circumstance conditions, thereby performing the highly-accurate optimization process.

As described above, according to the present embodiment, in case of controlling the density of the structure which forms the density measurement patch on the intermediate transfer body, it can be prevented that the density detection accuracy of the Bk patch is deteriorated, and thus there can be provided the multi-color image formation apparatus which can always perform the accurate density measurement and obtain the stable high-quality image.

Second Embodiment

In the above-described first embodiment, the patch formation onto the intermediate transfer body 5 and the patch density measurement have been collectively performed for the plurality of colors. On the other hand, in the present embodiment, as shown in FIG. 5, a series of processes concerning patch formation, patch density measurement and image formation condition optimization is performed sequentially for each of yellow (Y), magenta (M), cyan (C) and black (Bk).

That is, initially, densities of substrates or backgrounds of a printing region and a non-printing region are measured (step S20). Then, a Y toner patch is formed in the non-printing region on an intermediate transfer body 5 (step S130). Subsequently, a density of the Y toner patch is measured (step S140), and then a Y image formation condition is optimized (step S150). Such an optimization process for the Y (step S160) is performed sequentially for the M, the C and the Bk (steps S260, S360 and S460). In this case, a Bk toner patch is formed on the non-printing region in the same manner as in the first embodiment (that is, steps S430, S440 and S450 correspond to steps S30, S40 and S50 for the Bk toner patch as previously described.

As described above, by performing the optimization sequentially for each color, a time necessary for forming a next-color toner patch on a photosensitive drum 1 and a time necessary for transferring such the next-color toner patch on the drum 1 to the intermediate transfer body 5 can be efficiently utilized, whereby the optimization of an image formation condition can be effectively performed.

Other Embodiments

In the above-described first embodiment, all the patches are formed on the intermediate transfer body 5 at a time. However, in a case where the number of patches is increased to perform a highly-accurate optimization process and thus it becomes impossible to form, e.g., Bk patches in a non-printing region at a time, the steps S30 and S40 shown in FIG. 4 may be repeated, or the different patches are measured several times and each measured value may be output.

Therefore, a number of patches can be formed and measured even by using the restricted non-printing region, and thus the highly-accurate optimization process can be performed.

Further, in the non-printing region, only the Bk patch is formed. A substrate density of the non-printing region changes or varies according to accumulation of a residual toner which could not be sufficiently cleaned away. Therefore, in order to uniform the substrate density of each Bk patch, order of formation of the different-gradation Bk patches may be converted or changed for each optimization process. Such an operation can be realized by converting the order of generating patch data concerning the Bk patch stored in a pattern generator 205 in response to control of a CPU 206.

By such the operation, the substrate density of the non-printing region can be uniformed irrespective of its position, whereby the highly-accurate optimization process of an LUT concerning Bk can be performed.

In the above-described embodiments, the printer which uses the photosensitive drum and the intermediate transfer drum has been explained by way of example. However, the present invention may be applied to a printer which uses a photosensitive belt or an intermediate transfer belt.

Further, a position at which the patch is formed may be out of a center of the intermediate transfer body.

Furthermore, a plurality rows of the patches may be formed by providing a plurality of patch measurement sensors.

Furthermore, the patch may be measured by using not only an infrared light but also a near infrared light.

Furthermore, the patch measurement is not limited to strict density measurement. That is, a value (e.g., luminance value) corresponding to a density value of the patch may be measured.

In the above-described embodiments, in the optimization process, the LUT used for the gamma correction included in the image formation condition has been optimized. However, the present invention is not limited to this. That is, an another color process condition such as a masking process or the like may be optimized, or a process condition such as an exposure quantity, a development bias voltage or the like may be optimized.

Further, in the above-described embodiments, the patch has been formed on the intermediate transfer body. However, the patch may be formed on, e.g., the photosensitive drum.

As explained above, according to the above-described embodiments, by forming the density measurement image in the non-printing region where the change in the substrate density is smaller than that in the printing region, it can be prevented that accuracy in measurement is degraded on the basis of the change in the substrate density.

Further, the highly-accurate measurement can be performed in correspondence with the characteristic of the recording agent.

Furthermore, by uniforming the substrate densities, the highly-accurate optimization process can be performed.

Although the present invention has been described above with respect to the preferred embodiments, the invention is not limited to the foregoing embodiments but many modifications and variations are possible within the spirit and scope of the appended claims of the invention.

What is claimed is:

1. An image processing apparatus in an image formation apparatus for forming an image on an image support body in an electrophotographic system, said image processing apparatus comprising:

density measurement image formation means for forming a first density measurement image used for density measurement, in a non-printing region on the image support body by using a first recording agent, and for forming a second density measurement image used for density measurement, in a printing region on the image support body by using a second recording agent different from the first recording agent;

measurement means for measuring the first density measurement image and the second density measurement image; and control means for controlling image formation conditions of said image formation apparatus on the basis of a measurement result by said measurement means, the image formation conditions respectively corresponding to the first recording agent and the second recording agent.

2. An apparatus according to claim 1, wherein the first density measurement image is formed by using a black recording agent and the second density measurement image is formed by using a chromatic-color recording agent.

3. An apparatus according to claim 1, wherein said measurement means further measures a substrate density of the non-printing region.

4. An apparatus according to claim 1, wherein the image support body includes an intermediate transfer body.

5. An image processing method for optimizing an image formation condition of an image formation apparatus which forms an image on an image support body in an electrophotographic system, said method comprising the steps of:

forming a latent image of a first density measurement image used for density measurement, in a non-printing region on the image support body by using a first recording agent, and forming a second density measurement image used for density measurement, in a printing region on the image support body by using a second recording agent different from the first recording agent;

measuring the first density measurement image and the second density measurement image; and controlling the image formation conditions of the image formation apparatus on the basis of a measurement result in said measurement step, the image formation conditions respectively corresponding to the first recording agent and the second recording agent.

6. An image processing apparatus for optimizing an image formation condition in accordance with an output characteristic of image formation means, comprising:

density measurement image formation means for forming a plurality of density measurement images used for density measurement, the plurality of density measurement images respectively having different gradations;

measurement means for measuring the density measurement image; and image formation condition optimization means for optimizing the image formation condition on the basis of a measurement result by said measurement means, wherein said density measurement image formation means arbitrarily sets a formation order of the plurality of density measurement images respectively having the different gradations, for each optimization process.

7. An apparatus according to claim 6, wherein said density measurement image formation means forms same-accuracy patches on different positions respectively in the plurality of optimization processes.

8. An apparatus according to claim 6, wherein said measurement means measures an image density in a non-printing region.

9. An apparatus according to claim 6, wherein said image formation means includes an intermediate transfer body.

10. An image processing method comprising the steps of:

forming a plurality of density measurement images used for density measurement, the plurality of density measurement images respectively having different gradations;

measuring the density measurement images; and optimizing an image formation condition on the basis of a measurement result in said measurement step, wherein a formation order of the plurality of density measurement images respectively having the different gradations is arbitrarily set for each optimization process.

11. An image processing apparatus in an image formation apparatus which has an intermediate transfer body for simultaneously supporting images formed by a plurality of colors of recording agents, and a transfer body for transferring the images supported by the intermediate transfer body to a recording medium, said image processing apparatus comprising:

density measurement image formation means for forming a density measurement image used to density measurement, on the intermediate transfer body; and measurement means for measuring the density measurement image, wherein said measurement means performs the measurement in a state where a plurality of colors of density measurement images have been formed on the intermediate transfer body.

12. An apparatus according to claim 11, wherein the recording agents include at least yellow, magenta and cyan recording agents.

13. An apparatus according to claim 11, further comprising:

ground measurement means for measuring density on said intermediate transfer body before the density measurement image is formed.

14. An apparatus according to claim 13, wherein an image forming condition is determined in said image formation apparatus according to a measurement result of said measurement means and a measurement result of said ground measurement means.

15. An apparatus according to claim 14, wherein $\gamma$ characteristic is determined in said image formation apparatus according to a measurement result of said measurement means and a measurement result of said ground measurement means.

16. An apparatus according to claim 11, wherein said image processing apparatus includes a photosensitive drum.

17. An apparatus according to claim 11, wherein said density measurement image is gradation patch in each of the plurality of colors of recording agents.

18. An apparatus according to claim 17, wherein density measurement image of achromatic color is formed by image processing apparatus after density measurement image of chromatic color is formed.

19. An apparatus according to claim 11, wherein said measurement means executes measurement by using reflected light corresponding to infrared light or near infrared light.

20. An image processing method in an image formation apparatus which has an intermediate transfer body for simultaneously supporting images formed by a plurality of colors of recording agents and has a transfer body for transferring the images supported by the intermediate transfer body to a recording medium, said method comprising the steps of:

forming a density measurement image used to density measurement, on the intermediate transfer body; and measuring the density measurement image, wherein, in said measurement step, the measurement is performed in a state where a plurality of colors of density measurement images have been formed on the intermediate transfer body.

* * * * *